June 22, 1954  H. P. ALLEN  2,682,047
ELECTRICAL CONTROL SYSTEM FOR ORDNANCE FUZES
Filed June 4, 1945

WITNESSES:
C. H. Oberheim

INVENTOR
Harold P. Allen.
BY
Paul C. Friedemann
ATTORNEY

Patented June 22, 1954

2,682,047

UNITED STATES PATENT OFFICE 2,682,047

ELECTRICAL CONTROL SYSTEM FOR ORDNANCE FUZES

Harold P. Allen, Mansfield, Ohio, assignor, by mesne assignments, to the United States of America as represented by the Secretary of the Navy Application June 4, 1945, Serial No. 597,569

4 Claims. (Cl. 343—7)

This invention relates generally to ordnance fuses and more particularly to electrically operated proximity fuses.

In certain of its aspects this invention is related to a copending application of E. J. Naumann and L. W. Clark, Serial No. 597,574, filed on the same date as this application, and entitled Control Circuit.

In certain other of its aspects this invention is related to a copending application of E. J. Naumann, Serial No. 597,571, filed on the same date as this application, entitled Electrically Operated Device, and to a copending application of R. N. Harmon and E. J. Naumann, Serial No. 597,573, filed on the same date as this application, and entitled Electrically Operated Devices, the foregoing copending applications being each assigned to the same assignee as this invention.

Proximity fuses are applied to various types of bombs, shells, torpedoes, etc., and usually have a small, very compact radio transmitter built into the fuse, which is generally attached to the nose of the projectile. The operation of this radio unit in most cases depends upon the Doppler effect but sometimes the result is obtained by photoelectric circuits or other means of electrical discharge or response when the fuse equipped projectile approaches its objective.

With all such electrically operated proximity fuses, an electrical power supply is required to energize the various components of the electronic system. In most cases these systems, in addition to various low-voltage supply sources, require a high-voltage plate supply for the tubes, usually of the order of say, 150 volts. Heretofore small batteries have furnished the required electrical power. These batteries have many disadvantages. In almost all fuses the space is limited and it is essential that the power supply for these fuses occupy as little space as possible. For the most part, such batteries are bulky and must be made up in special cases to conform to certain design requirements. The power produced with respect to the size of the batteries must be very large and as a consequence, supercharged batteries are needed. These have a relatively short life when stored. After a short storage period, their power may drop to such a low level as to render them useless in a proximity fuse. Batteries are further objectionable in that they are not dependable when exposed to low temperatures. Still further, with such fuse power supplies there is a constant danger that the fuse might be exploded inadvertently due to a short circuit or for some other reason, resulting in an electrical discharge into the heater, which ignites the squib, for the reason that the batteries throughout their life when once connected in the fuse circuits offer an ever present source of electrical energy.

As a consequence of the foregoing considerations, generators have been applied as the electrical energy sources in fuse systems. Systems of this type form the subject matter of the hereinbefore mentioned copending applications Serial Nos. 597,571, and 597,573. In general, these systems include a small alternator which has a permanent magnet rotor driven by a fluid operated device, such as a propeller or turbine which is operated by the air stream impinging on the propeller or turbine blades when the fuse equipped projectile is projected into the atmosphere. It will be apparent that a short time delay is inherent before the generator comes up to operating speed, due to such reasons as the inertia of the mechanical system, the magnetic drag on the generator rotor and the changing velocity of the air stream, to mention a few. During this period the generator output and frequency of the output are rising and, in the case of Doppler operated devices, may pass through the range of frequencies to which the radio control units are responsive. Unless adequate precautions are taken, premature detonation of the projectile may result.

In utilizing a generator as the source of energy in a fuse, adequate steps must also be taken to insure a close control of the voltages available at the generator windings. Not only must the voltage patterns be similar, particularly over the operating range of frequencies, but also the ratio of the voltages must be within very close limits of a predetermined ratio, for the purpose, among other purposes, of obviating the possibility of secondary emission of the tubes in electronic system particularly in the case of the oscillator transmitter. The occurrence of secondary emission may result in modulation of the signal being transmitted in the frequency range of the beat signal developed in the heterodyne circuits with detonation of the fuse resulting.

One object of this invention is to provide a fuse for attachment to a projectile in which inadvertent detonation thereof is obviated.

Another object of this invention is to provide an electrically operated fuse powered by an alternator or other form of alternating-current generator, in which the maximum output of the generator is controlled.

Yet another object of this invention is to provide an ordnance fuse of the character mentioned in which suitable tuning of the alternator output is provided to cause the voltage curve thereof to reach a maximum point at a prearranged time in flight of the fuse equipped projectile or to maintain a minimum point for a given time.

A further object of this invention is to provide adequate control of the ratio of a pair of voltages available at an alternating current generator.

Other objects and advantages will become apparent from a study of the following specification when considered in conjunction with the accompanying drawing, in which.

Figure 4:
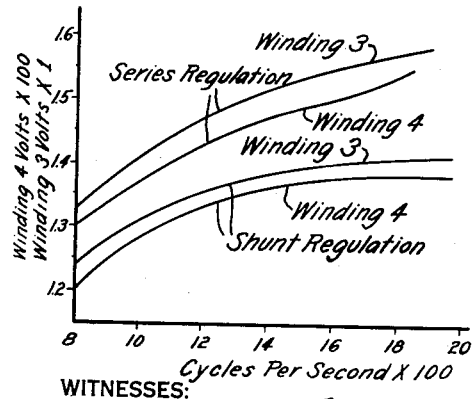
Figure 5:
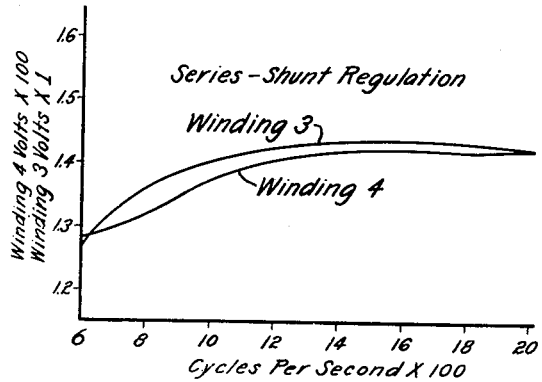

Fig. 4 graphically illustrates the characteristics of two types of generator output regulation; and Fig. 5 graphically illustrates the generator output regulation available with this invention.

Figure 1:
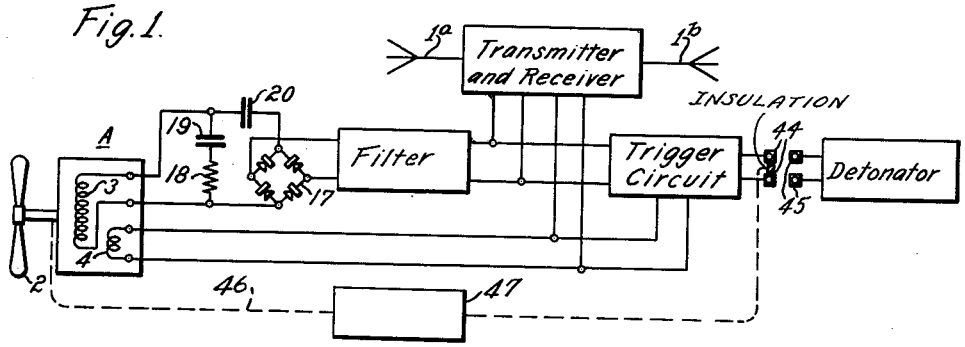
Figure 1 is a block diagram setting forth the principles of this invention.

A fuse of the type which depends for its operation upon the Doppler effect is diagrammatically illustrated in Figure 1. Systems for the operation of such electronic fuses sometimes consist of a combination of transmitter and receiver in one circuit, the receiver being of the heterodyne type. The transmitting antenna elements 1a and 1b radiate energy to the target which, in turn, reflects the radiated energy back to the fuse. The reflected energy wave or signal is received by the antenna elements 1a and 1b and is mixed with the direct or transmitted signal as in a heterodyne receiver. The reflected signal frequency is dependent upon the velocity of the fuse with respect to the target, as well as the direct signal frequency. The Doppler frequency equations relate the direct signal frequency to the reflected signal frequency, if the velocity between the signal source and the observer, or in this case, the receiver, is considered equal to twice the relative velocity between the fuse and the target. This condition substantially obtains because the receiver is mounted with the transmitter in the fuse and thus has the same relative movement with respect to the target as the signal source or transmitter. Therefore, the reflected signal, in most cases, differs in frequency from the direct signal. The reflected signal, upon being mixed with the direct signal, produces a beat frequency signal which increases in amplitude as the fuse approaches the target. The beat signal is amplified in the receiver and then passed to the trigger circuit where it is utilized, for example, to trigger a thyratron tube, which, when the beat signal amplitude is sufficient, becomes conducting and passes current through a heater in the detonator which ignites an associated squib forming part of a powder train in the detonator for igniting the main power charge of the fuse equipped projectile.

The contact members 44 and 45 in the circuits between the trigger circuit and the detonator include a stationary contact set which may, for example, be the set 45 and a movable set 44, the movable set being operated to engagement with the stationary set through a suitable mechanical connection with the propeller 2 indicated by the dotted line 46 which preferably includes a gear reduction unit 47 shown only in block form. In general, the purpose of such a contact arrangement is to introduce a safety feature to the fuse by preventing arming of the fuse until the projectile is in motion through the surrounding fluid medium and at a safe distance from the point of launching, at which time the propeller drive, after a predetermined number of propeller revolutions, closes the contact assembly.

Figure 2:
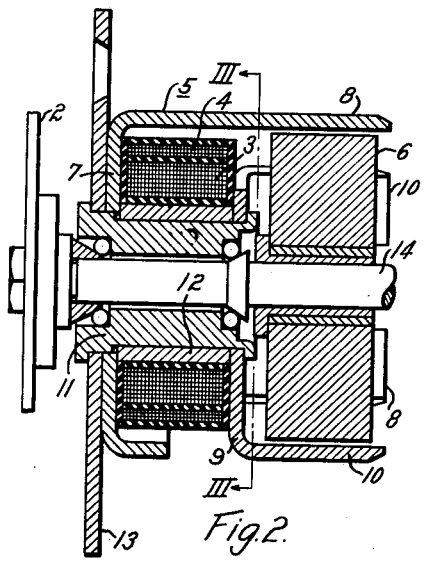
Fig. 2 is a longitudinal cross section of a generator embodied in fuse systems of the class described.
Figure 3:
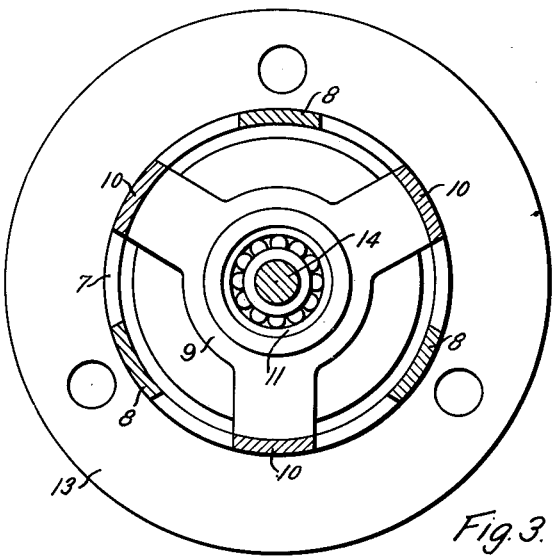
Fig. 3 is a sectional view taken on the line III—III of Fig. 2.

The generator or alternator generally designated A has two windings in which are generated different voltages. The main or high-voltage winding 3 primarily provides the plate voltage supply while the low-voltage winding 4 primarily supplies the filament circuits of the system. Figs. 2 and 3 illustrate a specific type of generator which has been employed in fuses. It includes a stator assembly 5 and a permanent magnet cylindrical rotor 6, spot magnetized for six alternate north and south magnetic poles. The stator assembly includes a sheet metal punching of magnetic material having a transverse section 7 and three finger-like members 8 extending axially therefrom in equal circumferentially spaced relation. A second punching of a similar character having a transverse section 9 and the finger-like members 10 is disposed with the finger-like members extending in the same axial direction as those of the first-mentioned punching and in equal circumferentially spaced interlocking relation therewith. The fingers 10 are shorter than the fingers 8 and when disposed so that they terminate in the plane defined by the extremities of the fingers 8 provide a spacing of the transverse sections 7 and 9 which are securely joined in this position by the combination core section and bearing housing 11. The windings 3 and 4 are disposed about the core structure on a split tubular spacer 12 and a mounting plate 13 is secured against the transverse core section 7. The rotor 6 for the generator is nonmagnetically secured to a shaft 14 journalled in bearings in the extremities of the core section 11 such that it rotates in the pole circle formed by the fingers 8 and 10, and a propeller or turbine, shown only fragmentarily at 2, is threadedly secured to the shaft extension opposite the rotor.

If north rotor poles are under the fingers 8 and south rotor poles are under the fingers 10, a magnetic flux will flow from the rotor across the air gaps between the rotor and stator to the fingers 8, thence through the fingers 8 and integral transverse section 7 to the core section 11, through which the flux then passes to the transverse section 9 and integral fingers 10 where the path is completed across the rotor stator air gaps to the rotor south poles. As the rotor moves in rotation, the rotor poles reverse position under the fingers 8 and 10 and the flux through the stator reverses. This arrangement results in one alternation for each 30° of rotor movement. Therefore an alternating magnetic flux results in the magnetic circuit and the alternating magnetic flux in the core section 11 induces voltages in the windings 3 and 4 linked therewith. Some control of generator output is obtained to give a flat characteristic above certain operating speeds by designing the generator to have a high leakage reactance or by operating the magnetic circuits at saturation above certain operating speeds.

Better regulation is obtained, however, by providing a regulating network in conjunction with the main generator winding 3. The action of this network in the main generator winding circuit is reflected in the winding 4 by reason of the close coupling of the windings and consequently regulation of this winding also obtains.

Proper application of the regulation circuit of this invention requires a knowledge of the frequency range over which regulation is desired. In ordnance operation, it is possible to know the speed of a projectile at any point in its trajectory. When the speed of the projectile is known it is possible to calculate the propeller R. P. M. and, hence, find the alternator R. P. M. When the alternator R. P. M. is known, the frequency of the alternating current supplied to the system through the rectifier 17 may be calculated. By such means it has been found that for a specific application the alternator R. P. M. over its electrical operating range ranges, for example, from 20,000 to 40,000 R. P. M. which for a six pole machine as illustrated produces an alternating voltage having a frequency range of roughly from 1,000 to 2,000 cycles per second. The upper speed limit of the alternator, however, is not a fixed value and is known to run as high as 100,000 R. P. M. It is desirable that the output of the alternator be regulated over this entire range.

The specific generator illustrated undergoes a reactance change in the neighborhood of 9,500 ohms to 14,000 ohms during the frequency change of 1,000 to 2,000 cycles per second. Hence, the generator may be assumed to be of neither high nor low reactance. With a high reactance generator a series regulating capacitor will produce good output regulation over a certain frequency range. As evidenced in Fig. 4, however, by the uppermost pair of curves designated Series Regulation, a series capacitor alone in the output of the main winding 3 does not provide adequate voltage control over the frequency range of 1,000 to 2,000 cycles per second. There exists a continuous positive slope to the curves over the mentioned frequency range which is unsuited for the specific application of energizing the amplifier. Further the spread of the curves is too great. In this connection it is to be noted that the curves are plotted to the same scale but that the voltage of the main winding is to be read 100 times the voltage indicated. The 100 to 1 ratio of voltages between the curves is thus not accurately maintained.

With shunt regulation as in the case of the two lower curves in Fig. 4 there results a reduction in voltage with a tendency to a flat response over the frequency range desired. The spread of the curves, however, is again too great although somewhat improved over the spread resulting from series regulation.

By providing a series connected resistor 18 and capacitor 19 in shunt relation with the main winding 3 and connecting a capacitor 20 in series in one side of the winding output circuit it is possible to secure regulation as indicated graphically in Fig. 5. These circuit elements resistor 18, capacitor 19 and capacitor 20, are so selected in their reactance values in conjunction with the rectifier, filter and radio unit load that substantial circuit resonance occurs over the mentioned frequency range. In general the function of the series resonant circuit is offset in sufficient degree by the characteristics of the parallel resonant circuit to produce the characteristic curves of Fig. 5 which, it will be noted, are intermediate the two pairs of curves of Fig. 4 insofar as magnitude is concerned. There also results a much smaller spread in the curves which means the 100 to 1 ratio of voltages desired is more closely attained.

It is very essential that the spread of voltages at the source generator are held to a minimum. Fuses equipped with such generators operate over very wide temperature ranges not only in the normal application but also depending upon the different climatic conditions under which they may be used. Such a control as provided tends to hold the voltages close to desired values over wide excursions of temperature. The advantages of this are evident. It permits greater latitude in the selection of circuit constants for the radio units of the fuse and along with this allows greater variation of these constants in response to temperature change without impairing the operation of the system.

The frequency range of the beat signal developed in the heterodyne circuits may be of the order of from 285 to 450 cycles per second. The regulating circuit herein described by providing an adequate control over the generator supply circuits provides a sufficiently small voltage over the generator frequency range corresponding to the beat signal range that the radio units are inoperative. As a result the radio units during this period do not respond to the generator signal over the beat signal frequency range. The curves are not plotted below 600 cycles per second but it will be apparent from the slope of both that the voltage decreases at lower frequencies and will be somewhat smaller in the range of the mentioned Doppler frequencies of 285 to 400 cycles per second. The tubes employed in the radio system of the fuse are fairly sensitive as to energizing potentials and do not operate on the voltage available over the mentioned low frequency range. The voltage output over the frequency range noted is sufficiently flat to provide good operation of the electronic units. In this connection it will be noted that in addition to the flattening of the voltage curves, the curves actually come closer together as the speed or frequency increases and slightly beyond 20,000 cycles per second meet, thus providing good voltage regulation both as to voltage magnitude and as to voltage ratio.

The foregoing disclosure and the showings made in the drawing are merely illustrative of the principles of this invention and are not to be interpreted in a limiting sense.

I claim as my invention:

1. Voltage generating apparatus including a regulating circuit having output terminals for use in a body operable through the atmosphere comprising, in combination, an alternating current generator having a pair of inductively related windings in which voltages are generated upon operation of said generator, air operated means for driving said generator, one of said windings being a high voltage winding and the other of said windings being a low voltage winding, said regulating circuit comprising a capacitor and a resistor connected in series, said serially connected capacitor and resistor being shunted across one of said windings, and a second capacitor connected to said winding so as to be in series with any load connected to said output terminals, whereby when the frequency of the output voltages is less than a predetermined frequency the output voltages increase rapidly with an increase in frequency, and whereby when the frequency of the output voltages is greater than said predetermined frequency, the output voltages remain substantially constant.

2. Voltage generating apparatus for use in a body operable through the atmosphere comprising, in combination, an alternating current generator having a pair of inductively related windings in which voltages are generated upon operation of said generator, air operated means for driving said generator, one of said windings being a high voltage winding and the other of said windings being a low voltage winding, a capacitor and a resistor connected in series, said serially connected capacitor and resistor being shunted across said high voltage winding, rectifying means connected to said high voltage winding, a capacitor connected in series between said winding and said rectifying means, and a filter circuit connected with said rectifying means for filtering the rectified electrical output thereof.

3. An electrical control system for an ordnance fuse comprising, in combination, an electrical signal transmitting and receiving system adapted for transmitting a high frequency signal to an object, receiving the signal reflected from the object, and thereafter mixing the transmitted and reflected signals to produce a beat signal, an alternating current generator for energizing the electrical transmitting and receiving system and having a pair of inductively related windings, one winding being a high voltage winding and the other winding being a low voltage winding, a fluid operated device for driving said generator, disposed for operation upon motion of said fuze through a fluid medium, said fluid operated device operating over a wide speed range whereby the frequency of the output of said generator varies greatly, circuit means connecting said generator winding to said electrical signal transmitting and receiving system for energizing said system, said windings having voltages induced therein, the frequency of which passes through the range of frequencies of said beat signal, regulating circuit means connected between said high voltage winding and said electrical signal transmitting and receiving system for maintaining the output voltages of said generator at less than the minimum necessary for operation of the transmitting and receiving means when the frequency of the output voltages is within or below the frequency range of said beat signal, and for maintaining the output voltages substantially constant at the values required for operating said transmitting and receiving means when the frequency of the output voltages is above the range of frequencies of the beat signal, whereby premature operation of the fuze is prevented, and means responsive to said beat signal to operate the fuze.

4. An electrical control system for an ordnance fuze as defined in claim 3 in which said regulating circuit means comprises a resistance and a capacitance serially connected together, said serially connected resistance and capacitance shunting the high voltage winding of the generator, and a capacitance connected in series with the electrical signal transmitting and receiving system.

References Cited in the file of this patent
UNITED STATES PATENTS

| Number | Name | Date |
|---|---|---|
| 1,104,257 | Goldschmidt | July 21, 1914 |
| 1,676,312 | Alexanderson | July 10, 1928 |
| 1,802,563 | Kuhn | Apr. 28, 1931 |
| 1,998,321 | Kaar | Apr. 16, 1935 |
| 2,022,517 | Patterson | Nov. 26, 1935 |
| 2,186,847 | Trogner | Jan. 9, 1940 |
| 2,218,859 | Schweitzer | Oct. 22, 1940 |
| 2,259,982 | Alexanderson | Oct. 21, 1941 |
| 2,424,193 | Rost et al. | July 15, 1947 |
| 2,468,120 | Senn | Apr. 26, 1949 |